(12) United States Patent
Takei

(10) Patent No.: US 7,209,281 B2
(45) Date of Patent: Apr. 24, 2007

(54) ELECTROPHORETIC DISPLAY DEVICE AND CONTACTLESS COMMUNICATION MEDIUM

(75) Inventor: Yoshiki Takei, Nagano (JP)

(73) Assignee: Seiko Epson Corporation (JP)

( * ) Notice: Subject to any disclaimer, the term of this patent is extended or adjusted under 35 U.S.C. 154(b) by 191 days.

(21) Appl. No.: 11/110,621

(22) Filed: Apr. 20, 2005

(65) Prior Publication Data

US 2005/0243405 A1 Nov. 3, 2005

(30) Foreign Application Priority Data

Apr. 28, 2004 (JP) ............................. 2004-133683

(51) Int. Cl.
*G02B 26/00* (2006.01)
*G09G 3/34* (2006.01)
*G09G 17/04* (2006.01)

(52) U.S. Cl. .......................... 359/296; 345/107; 430/32

(58) Field of Classification Search ................ 359/296, 359/529, 290, 291, 298; 345/107, 108, 85, 345/86; 430/32; 349/86, 89; 264/4, 4.1
See application file for complete search history.

(56) References Cited

FOREIGN PATENT DOCUMENTS

| JP | 2612472 | 2/1997 |
|---|---|---|
| JP | 2000-322549 | 11/2000 |

*Primary Examiner*—Alicia M. Harrington
*Assistant Examiner*—Brandi Thomas
(74) *Attorney, Agent, or Firm*—Harness, Dickey & Pierce, P.L.C.

(57) ABSTRACT

Electrophoretic display devices and contactless communication media are provided. A display electrode pattern, a first voltage application circuit to apply a voltage between the display electrode pattern and a transparent electrode, and a wiring pattern that electrically conducts the first voltage application circuit and the display electrode pattern are provided on the side of the back surface of a substrate. Also, a BG electrode pattern, a loop pattern of a predetermined height, and the transparent electrode are provided on the side of the surface of the substrate. Multiple electrophoretic particles and a dispersion medium to disperse the electrophoretic particles are enclosed inside the loop pattern and between the substrate and the transparent electrode. A voltage is applied between the transparent electrode and the display electrode pattern by the first voltage application circuit thereby causing the electrophoretic particles to migrate in the dispersion medium to display a desired image.

8 Claims, 6 Drawing Sheets

ELECTROPHORETIC DISPLAY DEVICE AND CONTACTLESS COMMUNICATION MEDIUM

RELATED APPLICATIONS

This application claims priority to Japanese Patent Application No. 2004-133683 filed Apr. 28, 2004 which is hereby expressly incorporated by reference herein in its entirety.

BACKGROUND

1. Technical Field

The present invention relates to electrophoretic display devices with an electrophoretic (EPD) display function and contactless communication media provided with the electrophoretic display devices, and more particularly, to electrophoretic display devices and contactless communication media which are suitable for reducing the difficulty of the work at the time of designing them.

2. Related Art

Conventionally, an electrophoretic display device described in Japanese Patent 2612472 which is a display device using electrophoretic particles is known.

The electrophoretic display device described in Japanese Patent 2612472 concerns an electrophoretic display device having a structure in which a dispersion system having electrophoretic particles dispersed therein is divided into discontinuous phases through porous spacers and sealed between a pair of opposing electrode plates, at least one of which is formed to be transparent, and characterized in that one of the electrode plates is formed to be flexible so that it can be successively come in contact with the porous spacers, and the other electrode plate is formed from a transparent rigid member.

Also, Japanese Laid-open Patent Application 2000-322549 describes a contactless IC card as a contactless communication media equipped with a display device that uses electrophoretic particles.

The contactless IC card described in Japanese Laid-open Patent Application 2000-322549 has a structure in which an IC is provided on a substrate, and a working electrode for display, a counter electrode, power supply terminals for the IC and lead wires connecting these electrodes are formed on the substrate by screen printing. Then, a mixture of a high polymer electrolyte gel and an electrochromic material having a triphenylmethane structure which is a type of electrophoretic particles is formed in a film shape so as to cover the work electrode and the counter electrode to obtain a display element. The color of the display element is changed by a small voltage supplied from the IC to perform display. Even when the supply of the voltage is stopped, the display can be maintained for a long time.

However, both of the electrophoretic display device described in Japanese Patent 2612472 and the contactless IC card described in Japanese Laid-open Patent Application 2000-322549 compose a display section by directly containing electrophoretic particles and a dispersion medium or forming a film thereof between a pair of electrode plates. Therefore, a display pattern (one of electrodes) and a transparent electrode (the other electrode) are formed on one surface side of a substrate in either of the cases, such that time-consuming works, such as, laying out of numerous wiring patterns for applying voltages to the display pattern, positioning of transparent electrodes, and the like on one side of the substrate are necessary at the time of designing them. In particular, in the case of the contactless IC card of Japanese Laid-open Patent Application 2000-322549, the work required at the time of designing further increases because positioning of an antenna, a communication circuit and the like and laying out of wiring patterns required for them need to be conducted in addition of the display section.

Accordingly, the present invention has been made in view of the unsolved problems of the conventional technologies described above, and its object is to provide electrophoretic display devices and contactless communication media which are suitable for reducing the time and labor when designing them.

It is noted that, to solve the problems described above, the present inventor has made an invention in the past concerning Japanese Laid-open patent application 2003-390959, and the present applicant filed the application. The present invention pertains to another invention to solve the problems described above, in which a part of the previous invention is further advanced.

SUMMARY

First Aspect

To achieve the object described above, an electrophoretic display device in accordance with a first aspect is characterized in comprising: a substrate and a display electrode composed of a conductor provided on one surface of the substrate and having a predetermined shape; a background electrode composed of a conductor provided on another surface of the substrate in a manner to overlap a periphery of the display electrode as viewed in a plan view; an insulator having a predetermined height and provided on the other surface of the substrate in a manner to entirely surround the display electrode and the background electrode as viewed in a plan view; a transparent electrode provided on the insulator in a manner to cohere to the insulator; a voltage application device for applying a voltage across the display electrode and the transparent electrode; a wiring provided on the one surface of the substrate for electrically conducting the voltage application device to the display electrode; and a plurality of electrophoretic particles and a dispersion medium for dispersing the electrophoretic particles, wherein the plurality of electrophoretic particles and the dispersion medium are contained inside the insulator between the substrate and the transparent electrode, and the voltage application device applies a voltage across the transparent electrode and the display electrode to thereby cause the electrophoretic particles to migrate in the dispersion medium to display a desired image.

It is noted here that, as the material of the electrophoretic particles, inorganic pigments, such as, for example, titanium oxide, zinc oxide, zirconium oxide, iron oxide, aluminum oxide, cadmium selenide, carbon black, barium sulfate, lead chromate, zinc sulfide, and cadmium sulfide, or organic pigments, such as, for example, phthalocyanine blue, copper phthalocyanine green, Hanza yellow, watching red, and diarylide yellow can be used.

As the dispersion medium, for example, hexane, deccan, hexadeccan, kerosene, toluene, xylene, olive oil, tricresyl phosphate, isopropanol, trichlorotrifluoroethane, tetrachloroethylene, and the like can be enumerated. To adjust its specific gravity to the electrophoretic particles for preventing the electrophoretic particles from settling or floating, a mixture of fluids can be used. In addition, to increase the charge of the electrophoretic particles or make them to the same polarity, an additive such as a resin or a surface active agent may be added to the above-described fluid if necessary.

Moreover, though the insulator is assumed to have a predetermined height, and this height is greater than the size of the electrophoretic particles and is sufficient so as not to disturb movements of the particles.

However, it should preferable be as low as possible to obtain a fast response speed when the voltage is impressed. In addition, the insulator encloses a certain area by a pattern having a prescribed height. In other words, the electrophoretic particles and the dispersion medium are enclosed by the substrate, the transparent electrode, and the insulator without leaking to the outside. Also, the transparent electrode is an electrode that is made from a transparent conductive film having a high level of transparency and conductivity together. For example, a transparent electrode composed of a thin film in which a small amount of fluorine is added to tin oxide or a thin film in which a small amount of antimony is added to indium oxide formed on a glass substrate can be enumerated.

According to the electrophoretic display device of the first aspect, the transparent electrode, the electrophoretic particles, the dispersion medium, and the background electrode are provided on the other surface side of the substrate, and the display electrode is provided on the one surface side of the substrate. Also, the wirings that electrically conduct the voltage application device and the display electrode provided on either one or the other surface of the substrate are provided on one surface side of the substrate, such that the time for laying out each of the wiring patterns can be reduced, and the work for positioning the transparent electrode on the other surface side of the substrate becomes easier at the time of designing them.

Further, for example, the transparent electrode and the background electrode may be connected to the same potential, such that a voltage would not be actively impressed to the electrophoretic particles between the transparent electrode and the background electrode. Therefore, the contrast of a displayed image and a background can be increased.

Second Aspect

An electrophoretic display device in accordance with the second aspect is characterized in comprising: a substrate and a display electrode composed of a conductor provided on one surface of the substrate and having a predetermined shape; a background electrode composed of a conductor provided on another surface of the substrate in a manner to overlap a periphery of the display electrode as viewed in a plan view; a display sheet provided on the other surface of the substrate in a manner to overlap the display electrode and to overlap a part or the whole of the background electrode as viewed in a plan view; a transparent electrode provided on the other surface of the substrate in a manner to cover the display sheet; a voltage application device for applying a voltage across the display electrode and the transparent electrode; and a wiring provided on the one surface of the substrate for electrically conducting the voltage application device to the display electrode, wherein the display sheet includes a plurality of electrophoretic particles and a dispersion medium for dispersing the electrophoretic particles, and the voltage application device applies a voltage across the transparent electrode and the display electrode to thereby cause the electrophoretic particles to migrate in the dispersion medium to display a desired image.

According to the structure described above, the transparent electrode, the display sheet including electrophoretic particles, and the background electrode are provided on the other surface side of the substrate, and the display electrode is provided on the one surface side of the substrate. Also, wirings that electrically conduct the voltage application device and the display electrode provided on either one or the other surface of the substrate are provided on one surface side of the substrate, such that the time for laying out each of the wiring patterns can be reduced, and the work for positioning the transparent electrodes on the other surface side of the substrate becomes easier at the time of designing them.

Further, for example, the transparent electrode and the background electrode may be connected to the same potential, such that a voltage would not be actively impressed to a portion interposed between the transparent electrode of the display sheet and the background electrode. Therefore, the contrast of a displayed image and a background can be increased.

Third Aspect

An electrophoretic display device in accordance with a third aspect is characterized in that the electrophoretic display device in accordance with the second aspect further includes an insulator having a predetermined height and provided on the other surface of the substrate in a manner to entirely surround the display electrode and the background electrode as viewed in a plan view, wherein the transparent electrode is provided on the insulator in a manner to cohere to the insulator. By this structure, the insulator having the predetermined height plays the role as a margin for mounting the transparent electrode, such that the insulator can contribute to preventing the transparent electrode from peeling off.

Fourth Aspect

An electrophoretic display device in accordance with a fourth aspect is characterized in that, in the electrophoretic display device in accordance with the first aspect or the third aspect, the height of the insulator from the other surface of the substrate is $h1$, and the height of the background electrode from the other surface of the substrate is $h2$, wherein $h2$ is smaller than $h1$.

Here, the dispersion medium including the electrophoretic particles is, for example, a sol state or a gel state. When a step-difference between the surface of the substrate and the side surface of the background electrode is large, the dispersion medium including the electrophoretic particles floats from the surface of the substrate due to this step-difference part as time passes, and the reliability of the electrophoretic display device may possibly be ruined.

According to electrophoretic display of the fourth aspect, for example, the step-difference formed between the other surface of the substrate and the side surface of the background electrode is relatively small, compared with the case where the height of the insulator and the height of the background electrode are the same. Accordingly, peeling of the dispersion medium including the electrophoretic particles from the substrate surface can be suppressed, which can contribute to the improvement of the reliability of the electrophoretic display device.

Fifth Aspect

Moreover, an electrophoretic display device in accordance with a fifth aspect is characterized in that, in the electrophoretic display device in any one of the first aspect through the fourth aspect, the transparent electrode and the background electrode are connected to the same potential. This structure makes it possible that a voltage would not be actively impressed across the transparent electrode and the background electrode. Accordingly, the influence of the voltage application device on the electrophoretic particles between the transparent electrode and the background electrode can be reduced, and the contrast of a displayed image and a background can be improved.

Sixth Aspect

An electrophoretic display device in accordance with a sixth aspect is characterized in that the electrophoretic display device according to any one of the first aspect through the fourth aspect, when the voltage application device is a first voltage application device, comprises a second voltage application device for applying a voltage across the transparent electrode and the background electrode to display a background color.

By this structure, the direction of migration of the electrophoretic particles between the transparent electrode and the display electrode and the direction of migration of the electrophoretic particles between the transparent electrode and the background electrode can be made mutually opposite, such that the contrast of a displayed image and a background can be further improved.

Seventh Aspect

A contactless communication medium in accordance with a seventh aspect is characterized in comprising an electrophoretic display device according to any one of the first aspect through the sixth aspect, a loop antenna composed of a conductor, and a communication circuit for performing data communications through the loop antenna.

It is noted here that the contactless communication medium is used in a RFID (Radio Frequency Identification) system or the like, and is also generally called a contactless identification tag, a RFID tag, or a data carrier. They can be in a variety of configurations, such as, a label shape, a card shape, a coin shape, a stick shape or the like. These configurations have close relation to their applications. For example, those carried by people may be in a key holder shape that is modified from a card shape or a label shape. Also, those used as carrier IDs for semiconductor devices are dominantly in a stick shape. Also, those that are sewed to clothes of linen are dominantly in a coin shape. Also, the card shaped one may be equipped with a display section. Furthermore, the contactless communication medium may be equipped with a storage region that is dedicated for reading data, or where data can be freely read and written, and can be operated by contactless power transmission from an antenna without a battery.

The RFID system is an ID system that uses radio waves or electromagnetic waves as a medium, in which the contactless communication medium has three characteristics, that is, (1) it has the size that is readily carried, (2) it stores information in an electronic circuit, and (3) it communicates in a contactless communication. Accordingly, the RFID system is used for the purpose of unifying people, items, vehicles and the like carrying contactless communication media with their information. In other words, where there are people, items and vehicles, required information can be retrieved from them at any time, and new information can be written if necessary.

There are four representative types of the RFID system, i.e., an inductive coupling system that communicates with a contactless communication medium, primarily using mutual induction of coils by alternating magnetic filed, an electromagnetic induction system that communicates with a contactless communication medium, primarily using electromagnetic wave in a long or medium wavelength range that is a 250 kHz or below, or a 13.56 MHz band, a microwave system that performs data communications between an antenna on a reader/writer side and a contactless communication medium with microwaves in a 2.45 GHz band, and an optical system that is provided with an LED as a light generation source and a phototransistor as a light sensor to communicate with a contactless communication medium using spatial transmission of light.

By the contactless communication medium of the seventh aspect, the electrophoretic display device according to the first aspect or the second aspect can be applied, and the loop antenna can be arbitrarily installed on one surface of the substrate or the other surface thereof Accordingly, the time for laying out each of the wiring patterns at the time of designing the contactless communication medium can be reduced, and the work for positioning the transparent electrodes on the other surface side of the substrate becomes easier.

Eighth Aspect

A contactless communication medium in accordance with an eighth aspect is characterized in that the contactless communication medium of the seventh aspect includes a driving electric power generation device for generating a driving electric power from electromagnetic radiation received with the loop antenna, wherein the voltage application device and the communication circuit are driven by the driving electric power generated by the driving electric power generation device.

In other words, by the driving electric power generation device, a driving electric power can be generated from electromagnetic radiation received with the loop antenna, and the driving electric power can thus be supplied to the voltage application device and the communication circuit. Accordingly, each of the components can be driven without having to supply a power from the outside.

DETAILED DESCRIPTION

Figure 1:
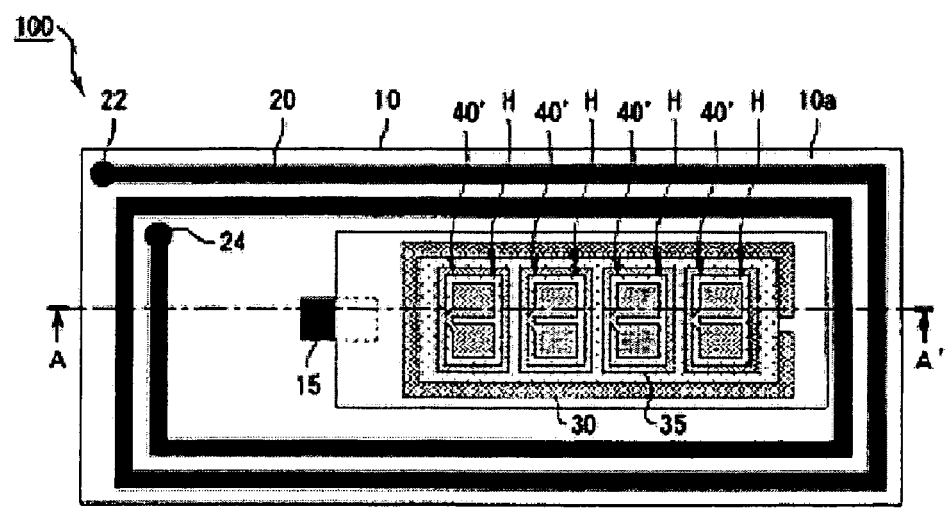
FIGS. 1(A)–(C) show views of an example of the structure of a RFID tag 100 in accordance with a first embodiment.
Figure 1:
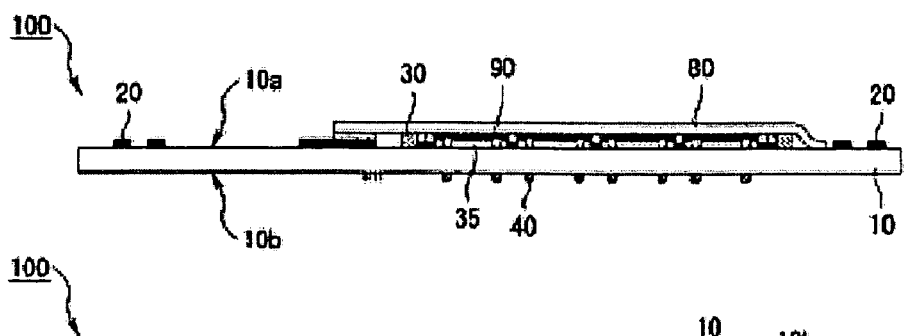
Figure 1:
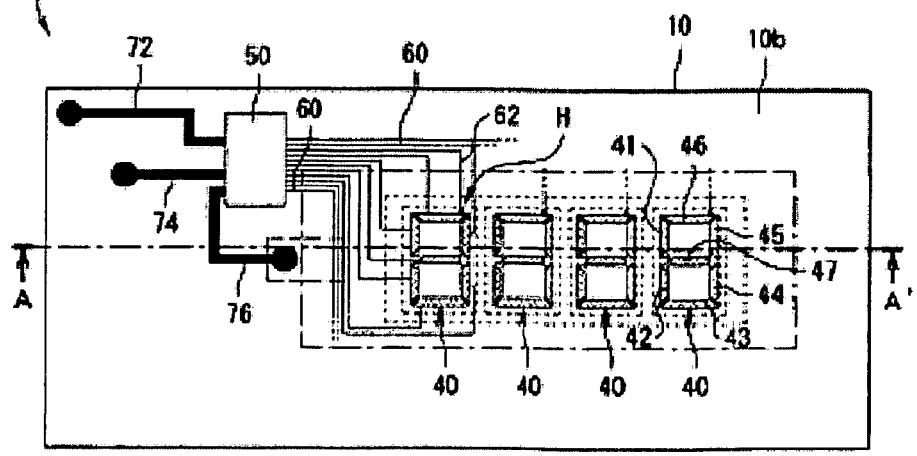

A RFID contactless IC tag (hereafter referred simply as a "RFID tag") in accordance with an embodiment of the present invention is described below with reference to the accompanying drawings.

First Embodiment

FIGS. 1(A) through (C) are plan views illustrating a composition example of a RFID tag 100 in accordance with a first embodiment of the present invention, and a cross-sectional view taken along a line A–A'. FIG. 1(A) shows a top surface side of the RFID tag 100. Also, FIG. 1(C) shows a view of a back surface side of the RFID tag 100 as it is seen through from its top surface side.

As shown in FIG. 1(A), the RFID tag 100 has a substrate 10, a loop antenna 20, an electrode conduction pattern 15, a loop pattern 30, and a background electrode pattern (hereafter, referred to as a "BG electrode pattern") 35 formed on the side of a surface 10a of the substrate 10.

Also, as shown in FIG. 1(C), the RFID tag 100 has a display electrode pattern 40, an IC chip 50, a plurality of wiring patterns 60 and 62 extending from the IC chip 50, and first through third conduction patterns 72, 74 and 76 formed on the side of a back surface 10b of the substrate 10. Furthermore, as shown in FIG. 1(B), the RFID tag 100 has numerous electrophoretic capsules 90 in which a plurality of electrophoretic particles and dispersion medium are encapsulated are enclosed inside the loop pattern 30 between the transparent electrode 80 and the substrate 10.

The substrate 10 shown in FIG. 1(A) has, for example, the size of an IC card of about 55 mm in length×85 mm in width×thickness 10 μm. The substrate 10 is formed from an appropriate material, such as, for example, polyethylene terephthalate (PET), polyimide, polyester, a glass epoxy laminated plate, or the like.

Also, the loop antenna 20 is composed of a conductor. The loop antenna 20 is formed in a spiral configuration along the outer circumference of the substrate 10, as shown in FIG. 1(A). Moreover, a first antenna conduction pattern 22 is formed at one end of the loop antenna 20, and a second antenna conduction pattern 24 is formed at the other end of the loop antenna 20. The height of the loop antenna 20 from the surface 10a of the substrate 10 is, for example, about 10–15 μm.

The loop pattern 30 is composed of an insulator. As shown in FIG. 1(A), the loop pattern 30 is formed inside the loop antenna 20, and is formed on the surface 10a of the substrate 10 in a manner to enclose the whole display electrode pattern 40 shown in FIG. 1(C) as viewed in a plan view.

Figure 4:
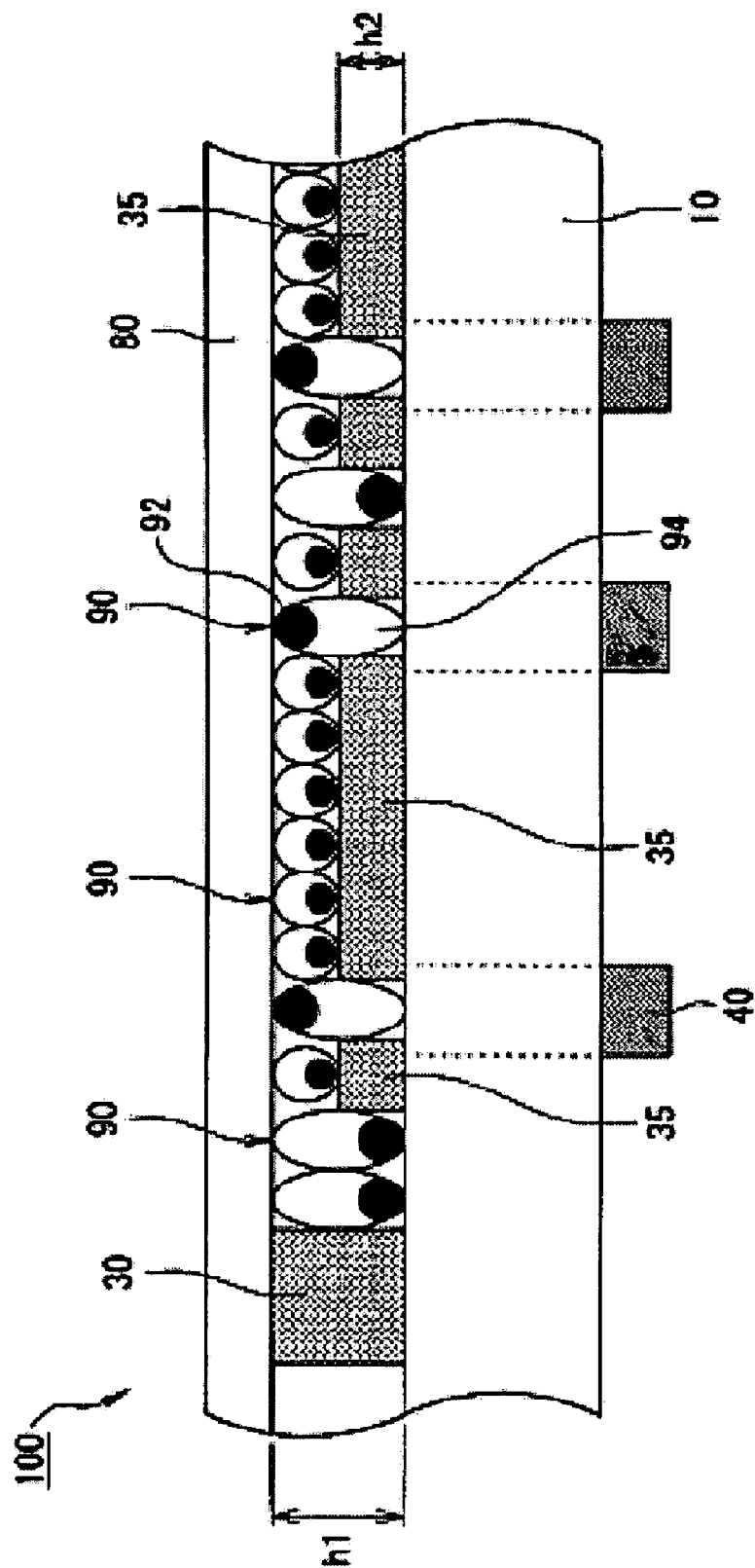
FIG. 4 shows a view illustrating how BG electrode patterns 35 and display electrode patterns 40 overlap one another across a substrate 10.

As shown in FIG. 1(B), the loop pattern 30 has the role of suppressing the flow of the electrophoretic capsules 90 (that is, like a "bank"). For this reason, the height (i.e., the thickness) h1 from the surface 10a of the substrate 10 of the loop pattern 30 assumes a size corresponding to the size/length of the electrophoretic capsule 90, as shown in FIG. 4. In the first embodiment, the size/length of the electrophoretic capsule 90 is, for example, about 10–15 μm, and the thickness h1 of the loop pattern 30 corresponds to this size, and is also, for example, about 10–15 μm.

Figure 3:
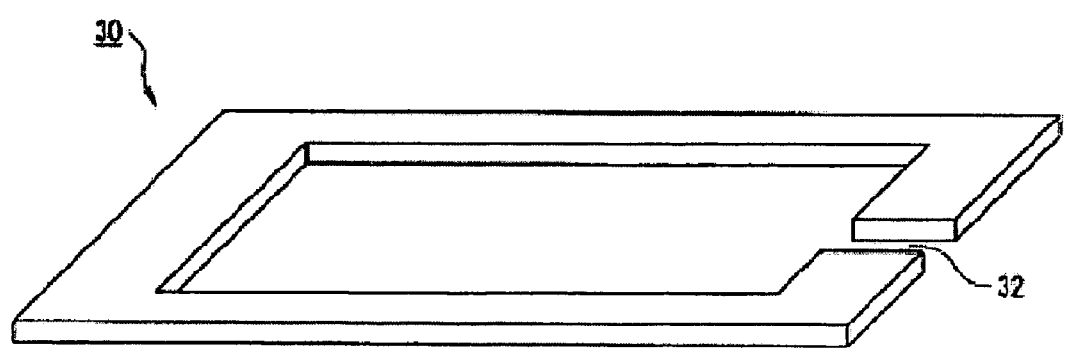
FIG. 3 shows a view of the configuration of a loop pattern 30.

FIG. 3 is a conceptual diagram that shows the shape of the loop pattern 30. As shown in FIG. 3, a cut 32 may be formed at a predetermined position in the loop pattern 30.

If the cut 32 is formed at a predetermined position of the loop pattern 30, when the transparent electrode 80 is formed coherently to the loop pattern 30 after the electrophoretic capsules 90 are coated on the surface 10a of the substrate 10, air can escape through the cut 32, and bubbles can be prevented from being mixed inside the loop pattern 30. If the cuts 32 are to be formed at a plurality of locations, the cuts 32 may preferably be provided along one side among the sides composing the loop pattern 30.

Figure 2:
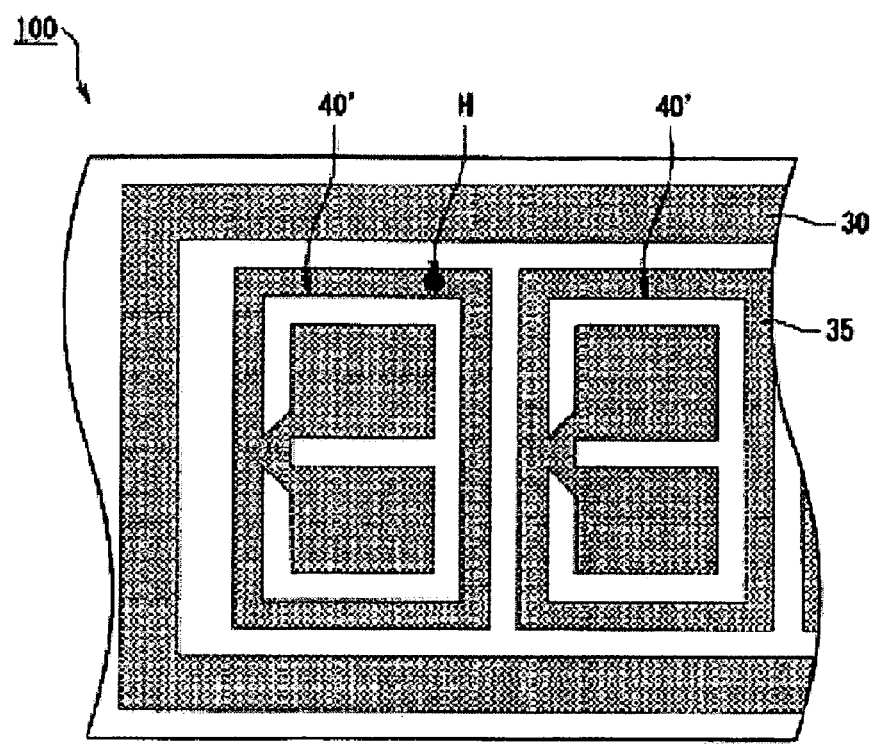
FIG. 2 shows a view of an example of the configuration of a display section 40'.

FIG. 2 is an enlarged plan view showing one example of the shape of the display section 40' in the RFID tag 100. As shown in FIG. 2, the display section 40', in other words, a portion corresponding to the display electrode pattern 40 formed on the back surface 10b of the substrate 10, may have a figure of eight formed with a 7-segment display, for example, as viewed in a plan view. The BG electrode pattern 35 is formed on the surface 10a of the substrate 10 in a manner to interpose the figure of eight from inside and outside without a gap, as viewed in a plan view. Moreover, as shown in FIG. 4, the BG electrode pattern 35 is formed in a manner to overlap the periphery of the display electrode pattern 40 across the substrate 10.

By such a structure, even if the BG electrode pattern 35 or the display electrode pattern 40 is formed somewhat shifted with respect to the substrate 10, it is possible that a gap may not be caused between the display panel 40' and the BG electrode pattern 35, as shown in FIG. 2. For example, the BG electrode pattern 35 is composed of a conductor such as copper or the like, and has a height (i.e., thickness) h2 from the surface 10a of the substrate 10, which is, for example, about 1 μm, as shown in FIG. 4.

The transparent electrode 80 shown in FIG. 1(B) is formed from a transparent colorless plastic film and a transparent colorless conductor formed on one surface (a lower side surface in FIG. 1(B)) of the plastic film. For example, the transparent electrode 80 is a ITO electrode formed by vapor-depositing an oxide of indium and tin onto the transparent colorless plastic film, and is provided coherently on the loop pattern 30 described above.

In this RFID tag 100, the loop pattern 30 plays the role as a mounting margin for the transparent electrode 80, such that peeling of the transparent electrode 80 can be suppressed. The thickness of the transparent electrode 80 is considerably thinner than the thickness of the BG electrode pattern 35, and is about 0.1 μm, for example.

The electrophoretic capsules 90 are enclosed inside the loop pattern 30 between the transparent electrode 80 and the substrate 10 without a gap, and the electrophoretic capsules 90 are arranged in a state in which they are not stacked on top of the other (i.e., in a non-stacked state) as viewed in a plan view. In FIG. 1(B), the size/length of the electrophoretic capsule 90 is, for example, about 10–15 μm. Moreover, the capsule itself is formed from a transparent compound film consisting of, for example, rubber and gelatin, or the like. In the present embodiment, a predetermined color pigment is used as the electrophoretic particles, and a colored medium is used as the dispersion medium in the capsule. It is noted here that, for example, the color of the electrophoretic particles may be blue, and the color of the dispersion medium may be white.

On the other hand, the display electrode pattern 40 formed on the back surface 10b of the substrate 10 shown in FIG. 1(C) is also called a segment, and is composed of a conductor such as copper, for example. The display electrode pattern 40 is formed from, for example, seven component parts 41–47 each consisting of a conductor, respectively. Each of the component parts 41–47 is connected to a connection terminal of the IC chip 50, respectively, by a dedicated wiring pattern 60. The line width of each of the component parts 41–47 composing the respective display electrode pattern 40 is, for example, about 0.6 mm. Also, in FIG. 1(B), the thickness of the display electrode pattern 40 (i.e., its height from the back surface 10b of the substrate 10) is, for example, about 10–15 μm. The periphery of each of the component parts 41–47 composing the respective display electrode pattern 40 overlaps the BG electrode pattern 35 with the substrate 10 being interposed between them, as indicated in FIG. 4.

Figure 6:
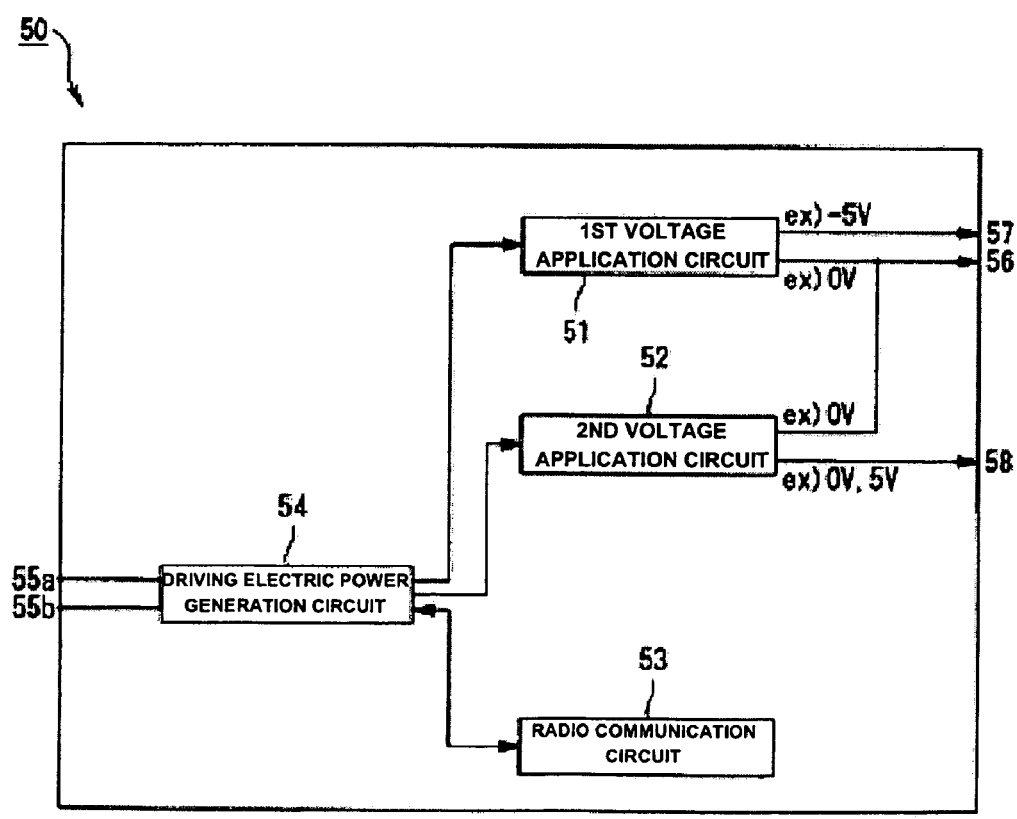
FIG. 6 shows a diagram of an example of the structure of the IC chip 50.

FIG. 6 is a block diagram of an example of the structure of the IC chip 50. As shown in FIG. 6, the IC chip 50 is structured to include first and second voltage application circuits 51 and 52, a radio communication circuit 53, and a driving electric power generation circuit 54. The first voltage application circuit 51 is a circuit that selects a specified composition part from among the composition parts of the display electrode pattern 40 (see FIG. 1(C)) described above, and applies a specified voltage across the selected composition part and the transparent electrode 80. Also, the second voltage application circuit is a circuit that applies a specified voltage (including OV) across the transparent electrode 80 and the BG electrode pattern 35. The radio communication circuit 53 is a circuit that performs radio communications with an external device by using the loop antenna 20 provided on the side of the surface 10a of the substrate 10. Moreover, the driving electric power generation circuit 54 is a circuit that generates a driving electric power from electromagnetic radiation received with the loop antenna 20 to drive each circuit of the IC chip 50.

Further, the IC chip 50 is equipped with first connection terminals 55a and 55b to be conducted with the loop antenna 20 (see FIG. 1 (A)), a second connection terminal 56 to be conducted with the transparent electrode 80 (see FIG. 1(B)), a third connection terminal 57 to be conducted with each composition part of the display electrode pattern 40 (see FIG. 1 (B)), and a fourth connection terminal 58 to be conducted with the BG electrode pattern 35 (see FIG. 1(B)). The first connection terminals 55a and 55b are connected with the two ends of loop antenna 20, respectively, and the number of them is two. Also, the number of each of the second and fourth connection terminals 56 and 58 is, for example, one. The third connection terminal 57 is connected with each composition part of the display electrode pattern 40, respectively, and therefore its number is a multiplier of the number of the display electrode patterns 40 and the number of the composition parts thereof In the embodiment of the present invention, because there are four display electrode patterns 40, and each of them has seven composition parts, as shown in FIG. 1(C), the number of the third connection terminals is twenty-eight, for example. It is noted that FIG. 6 shows only one of the third connection terminals 57 as a matter of convenience of description.

The IC chip 50 of this type is, for example, a flip chip. The IC chip 50 is mounted on a plurality of wiring patterns 60 and 62 and on the first—third conduction patterns 72, 74, and 76 through a bonding material such as ACF (anisotropic conductive film) or the like, as shown in FIG. 1(C). Then, one of the first connection terminals 55a of the IC chip 50 is connected to the first conduction pattern 72 and the other of the first connection terminals 55b is connected to the second conduction pattern 74. Also, the second connection terminal 56 of the IC chip 50 is connected to the third conduction pattern 76. Further, the third connection terminal 57 of the IC chip 50 is connected to the wiring pattern 60, and the fourth connection terminal 58 is connected to the wiring pattern 62.

Next, objects to which the first–third conduction patterns 72, 74 and 76 and the wiring patterns 60 and 62 shown in FIG. 1(C) are to be connected are described. The first and second conduction patterns 72 and 74 penetrate the substrate 10 and connect to first and second antenna conduction patterns 22 and 24, respectively, which are formed on the surface 10a of the substrate 10. By this structure, the first connection terminals 55a and 55b of the IC chip 50 are conductively connected to the two ends of the loop antenna 20. Also, the third conduction pattern 76 penetrates the substrate 10, and connects to an electrode conduction pattern 15 provided on the surface 10a of the substrate 10. By this structure, the second connection terminal 56 of the IC chip 50 is conductively connected to the transparent electrode 80.

Further, the wiring patterns 60 shown in FIG. 1(C) extend along the back surface 10b of the substrate 10 to, for example, the four display electrode patterns 40, respectively. These wiring patterns 60 are connected to the composition parts 41–47 of each of the display electrode patterns 40, respectively, without being mutually short-circuited. With such a structure, the third connection terminals 57 of the IC chip 50 are conductively connected to the composition parts 41–47 of each of the four display electrode patterns 40, respectively. It is noted that, in FIG. 1(C), only a part of the wiring patterns 60 is shown as a matter of convenience of illustration.

Also, the wiring patterns 62 shown in FIG. 1(C) pass through contact holes H provided in the substrate 10, and connect to the BG electrode patterns 35 formed on the surface 10a of the substrate 10, as shown in FIG. 1(A). By such a structure, the fourth connection terminal 58 of the IC chip 50 is conductively connected to the transparent electrode 80. The wiring patterns 60 and 62 are composed of a conductor, such as, for example, copper.

It is noted that electrical conduction between the first conduction pattern 72 on the back surface 10b of the substrate 10 and the first antenna conduction pattern 22 on the surface 10a of the substrate 10 can be obtained by, for example, a "caulking process" with caulking pins. Similarly, electrical conduction between the second conduction pattern 74 and the second antenna conduction pattern 24, and electrical conduction between the third conduction pattern 76 and the electrode conduction pattern 15 are obtained by a "calking process," respectively.

In the aforementioned "calking process," a plurality of calking pins of a calking jig are positioned, and the plurality of calking pins are simultaneously pressed against the corresponding respective conduction patterns, whereby a plurality of calking processes are conducted at once.

It is noted that the electrical conduction between the first antenna conduction pattern 22 and the first conduction pattern, the electrical conduction between the second antenna conduction pattern 24 and the second conduction pattern, and the electrical conduction between the third conduction pattern and the electrode conduction pattern 15 are not limited to the calking process, and can be provided by other processes as long as they can be electrically conducted.

It is noted that an electrophoretic display device, which is a composition of the RFID tag 100, is formed from the substrate 10, the electrode conduction pattern 15, the BG electrode pattern 35, the electrophoretic capsules 90, the transparent electrode, the IC chip 50, and the wiring patterns 60 and 62.

Next, concrete operations of the display processing by using the electrophoretic particles in the RFID tag 100 are described.

First, because the RFID tag 100 shown in FIGS. 1(A) through (C) does not have a power supply, it receives electromagnetic radiation sent from an external unit (not shown) with the loop antenna 20, and generates a driving electric power with the driving electric power generation circuit 54 of the IC chip 50 shown in FIG. 6.

As indicated in FIG. 6, the driving electric power is supplied to the first and second voltage application circuits 51 and 52 and the radio communication circuit 53, whereby each circuit of the IC chip 50 is driven, to perform the processing to selectively display an image in the display section 40' of the RFID tag 100. It is noted here that the processing to selectively display an image may mean to display any one of numbers from 0 to 9, or not to display anything, or the like, as long as each one of the display sections 40' is concerned. Because the RFID tag 100 includes, for example, four of such display panels 40' arranged in a horizontal direction, these display sections 40' can be combined to arbitrarily display a figure up to 4 digits.

For example, a figure of eight "8" can be displayed by impressing a voltage with the first voltage application circuit 51 of the IC chip 50 between all of the composition parts of the display electrode pattern 40 and the transparent electrode 80. It is noted here that the first voltage application circuit 51 of the IC chip 50 can apply the voltage to the transparent electrode 80 and the display electrode pattern 40, assuming one of them as a positive pole and the other as a negative pole.

As a concrete example, each of the composition parts of the display electrode pattern 40 is assumed to be as a negative pole, and the transparent electrode 80 as a positive pole, and the first voltage application circuit 51 applies a voltage across the two poles. Here, the potential of the transparent electrode 80 is, for example, 0 V (i.e., it is connected with the ground), and the potential of each of the composition parts of the display electrode pattern 40 is assumed to be, for example, −5 V. Also, in this example, the potential of the BG electrode pattern 35 is set to, for example, 0 V (i.e., it is connected with the ground) by the second voltage application circuit 52.

Then, when the electrophoretic particles are of the type that is negatively charged, for example, as shown in FIG. 4, the negatively charged electrophoretic particles 92 migrate in the dispersion medium 94 toward the transparent electrode 80 (that is, toward the side of the surface 10a of the substrate 10), and abut against the inner walls of the capsules and stop there. As a result, the display panel 40' shown in FIG. 2 appears to be colored in the color of the electrophoretic particles 92 (for example, blue).

Here, because both of the transparent electrode 80 and the BG electrode pattern 35 are connected with the same potential, the electrophoretic particles 92 can be made not to migrate between them. Because the BG electrode pattern 35 is provided, it is possible not to actively apply a voltage to the electrophoretic particles 92, such that the contrast of blue of the display panel 40' and white of the background can be increased. Even when the application of the voltage is stopped, these colors are sustained once they are colored due to the above-described migration.

Thus, according to the RFID tag 100 in accordance with the first embodiment of the present invention, the transparent electrode 80, the electrophoretic capsules 90, and the BG electrode pattern 35 are provided on the side of the surface 10a of the substrate 10, and the display electrode pattern 40 is provided on the side of the back surface 10b of the substrate 10.

Also, a plurality of (for example, 7×4=28) wiring patterns 60 that electrically conduct the first voltage application circuit 51 of the IC chip 50 provided on the back surface 10b of the substrate 10 to the respective composition parts 41–47 of the display electrode patterns 40 are provided on the back surface 10b of the substrate 10. Therefore, when the RFID tag 100 is designed, the time for laying out each of the wiring patterns 60 can be reduced, and the work for positioning of the transparent electrode 80 on the side of the surface 10a of the substrate 10 become easier.

Moreover, according to the RFID tag 100, the size relation between the thickness h1 of the loop pattern 30 and the thickness h2 of the BG electrode pattern is h1>h2, such that a step difference defined between the surface 10a of the substrate 10 and the side surface of the BG electrode pattern 35 is smaller compared to the case of h1=h2, for example. Accordingly, peeling of the electrophoretic capsules 90 from the surface 10a of the substrate 10 can be suppressed, which can contribute to the improvement of the reliability of the RFID tag.

If the BG electrode pattern 35 works as a conductor, the smaller the thickness h2 thereof, the better. By reducing the thickness h2 as much as possible to the extent that the function of the BG electrode pattern 35 as a conductor is not ruined, the step-difference defined between the surface 10a of the substrate 10 and the side surface of the BG electrode pattern 35 can be made smaller. Accordingly, peeling of the electrophoretic capsules 90 from the surface 10a of the substrate 10 can be suppressed even better.

In addition, according to the RFID tag 100, the transparent electrode 80 and the BG electrode pattern 35 are connected to the same potential. Therefore, it is possible that a voltage would not be actively impressed to the electrophoretic particles 92 between the transparent electrode 80 and the background electrode 35, and therefore, the contrast of the display section 40' (i.e., an image) and the background can be increased.

Moreover, according to the RFID tag 100, as shown in FIG. 1 (C), the wiring design of the wiring patterns 60 and 62 is devised such that they do not overlap one another as much as possible with the electrophoretic capsules 90 and the substrate 10 being interposed between them. By this structure, even when a potential difference is caused between the wiring patterns 60 and 62 and the transparent electrode 80, unintended migration of the electrophoretic particles 92 can be suppressed as much as possible. As a result, for example, an incident in which blue is displayed along the wiring pattern in the background that should originally be displayed in white can be prevented. It is possible to contribute to improving the quality of the image representation in the RFID tag 100.

In the first embodiment, the surface 10a of the substrate 10 corresponds to the other surface of the substrate in accordance with the present invention, and the back surface 10b of the substrate 10 corresponds to the one surface of the substrate in accordance with the present invention. Moreover, the display electrode pattern 40 corresponds to the display electrode of the present invention, and the BG Electrode pattern 35 corresponds to the background electrode of the present invention. Further, the loop pattern 30 corresponds to the insulator of the present invention. Moreover, the first voltage application circuit 51 corresponds to the first voltage application device of the present invention, and the second voltage application circuit 52 corresponds to the second voltage application device of the present invention. The driving electric power generation circuit 54 corresponds to the driving electric power generation device of the present invention, and the radio communication circuit 53 corresponds to the communication circuit of the present invention. Also, the RFID tag 100 corresponds to the contactless communication medium of the present invention.

It is noted that the first embodiment has been described as to the case in which a voltage of 0 V is applied between the transparent electrode 80 and the BG electrode pattern 35 (in other words, the transparent electrode 80 and the BG electrode pattern 35 are connected with the same potential) by the second voltage application circuit 52 shown in FIG. 6 at the time of displaying an image in the RFID tag 100. However, by applying a voltage for displaying a background color between the BG electrode pattern 35 and the transparent electrode 80, the contrast of the displayed image and the background can be improved further. Such a voltage for displaying a background color is also impressed with the second voltage impression circuit 52 shown in FIG. 6.

For example, when a figure of eight "8" is to be displayed in the display section of the RFID tag 100, the transparent electrode 80 is connected with the ground, a voltage of −5 V is applied to the display electrode pattern 40, and a voltage of +5 V is applied to the BG electrode pattern 35. Then, as indicated by upwardly directed arrows in FIG. 5, negatively charged electrophoretic particles 92 immediately above the display electrode patterns 40 migrate in the dispersion medium 94 and move toward the transparent electrode 80, and abut against the inner walls of the capsules and stop there. As a result, the display section 40' of the RFID tag 100 (see FIG. 2) appears to be colored in the color of the electrophoretic particles (for example, blue).

Figure 5:
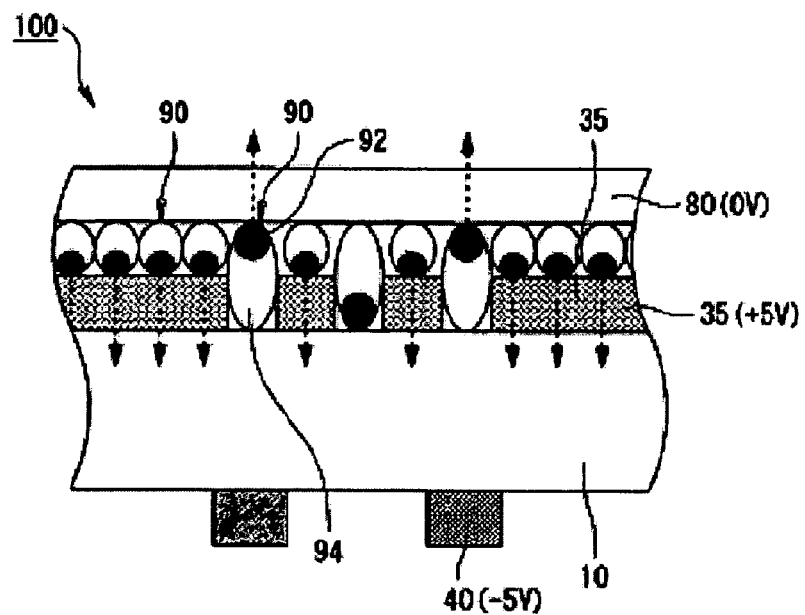
FIG. 5 shows a view illustrating an example of voltage application in the RFID tag 100.

On the other hand, negatively charge electrophoretic particles 92 immediately above the BG electrode patterns 35 migrate in the dispersion medium 94 and move toward the BG electrode patterns 35, as indicated by downwardly directed arrows in FIG. 5, and abut against the inner walls of the capsules and stop there. As a result, the background surrounding the display section of the RFID tag 100 appears to be colored in the color of the dispersion medium (for example, white). In other words, the direction of migration of the electrophoretic particles 92 between the transparent electrode 80 and the display electrode pattern 40, and the direction of migration of the electrophoretic particles 92 between the transparent electrode 80 and the BG electrode pattern 35 can be made opposite to each other. As a result, the background can be made to appear in much whiter color, compared with the case in which the BG electrode pattern 35 is connected to the ground, such that the contrast of the displayed image and the background can be even further increased.

Also, when a figure of eight "8" is to be displayed in the display section 40' of the RFID tag 100, the transparent electrode 80 is connected with the ground, a voltage of +5 V is applied to the display electrode pattern 40, and a voltage of −5 V is applied to the BG electrode pattern 35. Then, the directions of the arrows in FIG. 5 are reversed. As a result, in this case, the background can be made to appear in deeper blue color. As a result, the contrast of the white of the display section 40' and the blue of the background can be increased even higher.

Second Embodiment

In the first embodiment described above, the description has been made as to the case in which the electrophoretic capsules 90 that encapsulate the electrophoretic particles 92 and the dispersion medium 94 are enclosed inside the loop pattern 30 and between the substrate 10 and the transparent electrode 80. However, the electrophoretic particles 92 and the dispersion medium 94 need not necessarily be encapsulated; but, for example, a plurality of electrophoretic particles 92 and a dispersion medium 94 may be directly enclosed inside the loop pattern 30 and between the substrate 10 and the transparent electrode 80.

Alternatively, a display sheet of which plural electrophoretic particles and a dispersion medium are formed into a gelatinous solid may be prepared, and the display sheet may be provided on the surface 10a of the substrate 10 in a manner to overlap the display electrode patterns 40, and to overlap a part or all of the BG electrode patterns 35 as viewed in a plan view. The second embodiment shows one of such examples.

Figure 7:
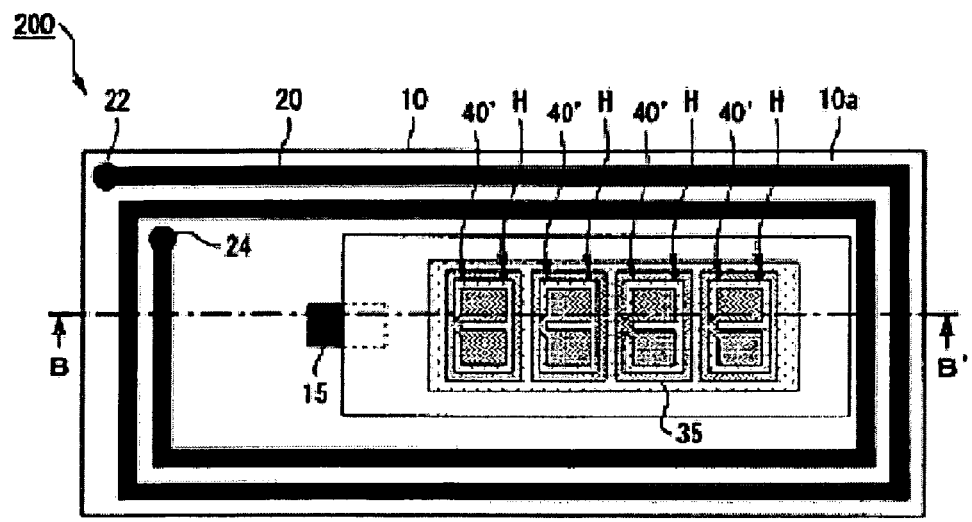
FIGS. 7(A)–(C) show views of an example of the structure of a RFID tag 200 in accordance with a second embodiment.
Figure 7:
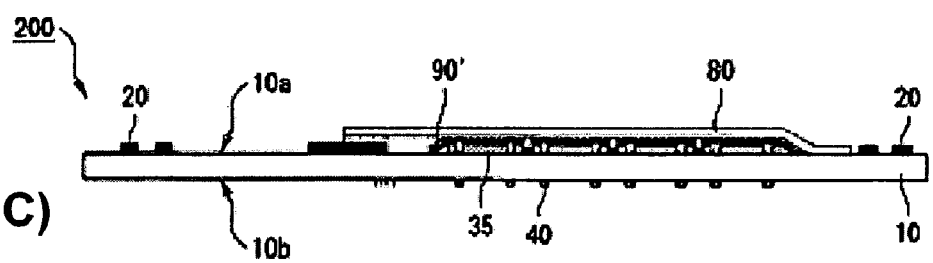
Figure 7:
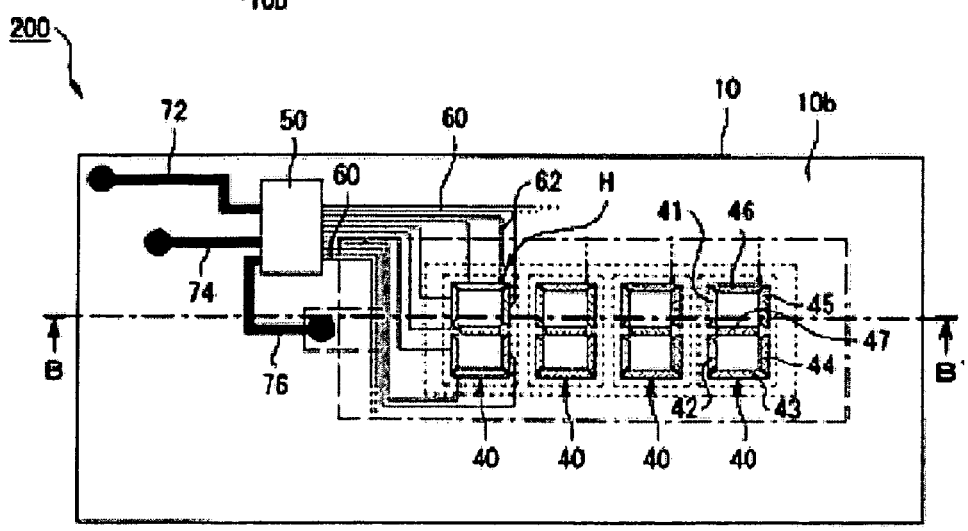

FIGS. 7 are plan views illustrating a composition example of a RFID tag 200 in accordance with a second embodiment of the present invention, and a cross-sectional view taken along a line B–B'. FIG. 7(A) shows a top surface side of the RFID tag 200. Also, FIG. 7(C) shows a view of a back surface side of the RFID tag 200 as it is seen through from its top surface side. In FIGS. 7(A) to (C), portions having the same functions as those of the RFID tag 100 indicated in FIG. 1 are appended with the same codes, and their detailed description is omitted.

As shown in FIG. 7(B), the RFID tag 200 has a display sheet 90' provided in a manner to overlap display electrode patterns 40', and to overlap all of BG electrode patterns 35 as viewed in a plan view. The display sheet 90' is solidified into a gelatinous state with slight elasticity and hardness, in which plural electrophoretic capsules are arranged horizontally in a non-stacked state. The thickness of the display sheet 90' is about 30–70 μm, for example. Also, a transparent electrode 80 is provided on the display sheet 90', as shown in FIG. 7(B).

In the RFID tag 200, the display sheet 90' is solidified into a gelatinous state with slight elasticity and hardness, such that the electrophoretic capsules would not flow easily, and therefore a "bank" that suppresses the flow of the electrophoretic capsules is unnecessary. For this reason, a loop pattern is omitted in the RFID tag 200 on the surface 10a of the substrate 10, as shown in FIGS. 7(A) and (B).

The display processing that uses electrophoretic particles in the RFID tag 200 is conducted in a similar manner as that of the RFID tag 100 described above.

By the structure described above, like the RFID tag 100 described in the first embodiment, the time for laying out each of the wiring patterns 60 and 62 at the time of designing them can be reduced, and the work of positioning of the transparent electrode 80 on the top surface side of the substrate 10 becomes easier. Also, in accordance with the RFID tag 200, the thickness of the BG electrode pattern 35 may be made to, for example, 1 μm or less, to thereby reduce a step-difference between the surface 10a of the substrate 10 and the side surface of the BG electrode pattern 35, such that peeling of the display sheet 90' from the surface of the substrate 10 can be suppressed. As a result, it is possible to contribute to the improvement of the reliability of the RFID tag. In the second embodiment, the RFID tag 200 corresponds to a contactless communication medium of the present invention.

It is noted that the second embodiment has been described as to the case in which a loop pattern is omitted from the surface 10a of the substrate 10. However, in the RFID tag 200, a loop pattern may also be provided on the surface 10a of the substrate 10, like the RFID tag 100. With this structure, though the loop pattern cannot be expected to play the role as a "bank," it plays the role as a margin for mounting the transparent electrode 80, and thus it is possible to contribute to preventing the transparent electrode 80 from peeling off.

Figure 8:
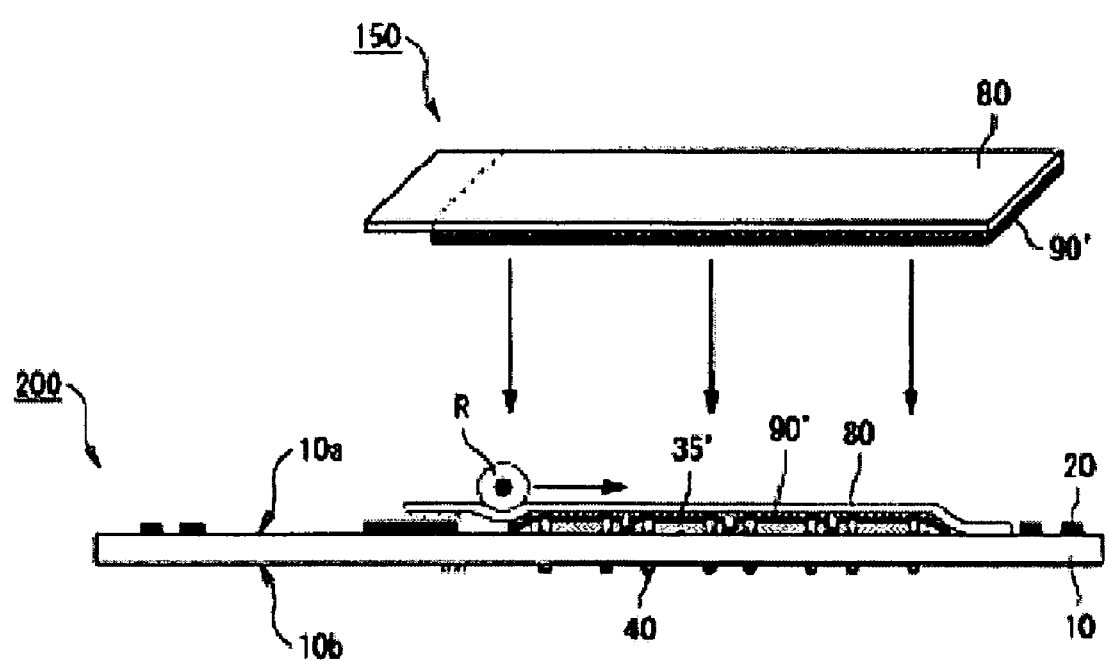
FIG. 8 shows a view illustrating an example of a method for manufacturing the RFID tag 200.

Moreover, when manufacturing the RFID tag 200 described above, for example, a transparent electrode sheet 150 in which a display sheet 90' is attached to a conductor side of a sheet-like transparent electrode 80 is prepared, as shown in FIG. 8. Then, the side of the display sheet 90' of the transparent electrode sheet 150 is faced toward the surface 10a of the substrate 10 on which a BG electrode pattern 35 is formed, and the transparent electrode sheet 150 is placed on the surface 10a of the substrate 10. Then, for example, a roller R or the like is pressed as a pressing device against the upper surface of the transparent electrode sheet 150 and moved, thereby sticking the transparent electrode sheet 150 to the surface 10a of the substrate 10. By such a structure, the step of enclosing the electrophoretic capsules 90 and the step of sticking the transparent electrode 80 can be conducted together, which can contribute to the simplification of the process of manufacturing RFID tags, compared to the RFID tag 100 described in the first embodiment.

Furthermore, though the BG electrode pattern 35 is formed independently for each of the display electrode patterns 40 in the first and second embodiments, the BG electrode pattern 35 is not limited to such a structure, and may be formed in one piece to surround each of the display electrode patterns 49.

What is claimed is:

1. An electrophoretic display device comprising:
   a substrate, and a display electrode composed of a conductor provided on one surface of the substrate and having a predetermined shape;
   a background electrode composed of a conductor provided on another surface of the substrate in a manner to overlap a periphery of the display electrode as viewed in a plan view;
   an insulator having a predetermined height and provided on the other surface of the substrate in a manner to entirely surround the display electrode and the background electrode as viewed in a plan view;
   a transparent electrode provided on the insulator in a manner to cohere to the insulator;
   voltage application means for applying a voltage across the display electrode and the transparent electrode;
   a wiring provided on the one surface of the substrate for electrically conducting the voltage application means to the display electrode; and
   a plurality of electrophoretic particles and a dispersion medium for dispersing the electrophoretic particles,
   wherein the plurality of electrophoretic particles and the dispersion medium are contained inside the insulator between the substrate and the transparent electrode, and
   the voltage application means applies a voltage across the transparent electrode and the display electrode to thereby cause the electrophoretic particles to migrate in the dispersion medium to display a desired image.

2. An electrophoretic display device comprising:
   a substrate and a display electrode composed of a conductor provided on one surface of the substrate and having a predetermined shape;
   a background electrode composed of a conductor provided on another surface of the substrate in a manner to overlap a periphery of the display electrode as viewed in a plan view;
   a display sheet provided on the other surface of the substrate in a manner to overlap the display electrode and to overlap a part or the whole of the background electrode as viewed in a plan view;
   a transparent electrode provided on the other surface of the substrate in a manner to cover the display sheet;
   voltage application means for applying a voltage across the display electrode and the transparent electrode; and
   a wiring provided on the one surface of the substrate for electrically conducting the voltage application means to the display electrode,
   wherein the display sheet includes a plurality of electrophoretic particles and a dispersion medium for dispersing the electrophoretic particles, and
   the voltage application means applies a voltage across the transparent electrode and the display electrode to thereby cause the electrophoretic particles to migrate in the dispersion medium to display a desired image.

3. An electrophoretic display device according to claim 2, further comprising an insulator having a predetermined height and provided on the other surface of the substrate in a manner to entirely surround the display electrode and the background electrode as viewed in a plan view, wherein the transparent electrode is provided on the insulator in a manner to cohere to the insulator.

4. An electrophoretic display device according to claim 1, wherein the height of the insulator from the other surface of the substrate is h1, and the height of the background electrode from the other surface of the substrate is h2, wherein h2 is smaller than h1.

5. An electrophoretic display device according to claim 1, wherein the transparent electrode and the background electrode are connected to the same potential.

6. An electrophoretic display device according to claim 1, wherein the voltage application means is a first voltage application device, and further comprising a second voltage application device for applying a voltage across the transparent electrode and the background electrode to display a background color.

7. A contactless communication medium comprising:
   the electrophoretic display device recited in claim 1;
   a loop antenna composed of a conductor; and
   a communication circuit for performing data communications through the loop antenna.

8. A contactless communication medium according to claim 7, comprising driving electric power generation means for generating a driving electric power from electromagnetic radiation received with the loop antenna, wherein
   the voltage application means and the communication circuit are driven by the driving electric power generated by the driving electric power generation means.

* * * * *